(12) United States Patent
Jogan et al.

(10) Patent No.: US 11,978,593 B2
(45) Date of Patent: May 7, 2024

(54) FILM CAPACITOR AND EXTERIOR CASE FOR FILM CAPACITOR

(71) Applicants: Murata Manufacturing Co., Ltd., Nagaokakyo (JP); SHIZUKI ELECTRIC CO., INC., Nishinomiya (JP)

(72) Inventors: Satoru Jogan, Nagaokakyo (JP); Kimiaki Kikuchi, Nishinomiya (JP)

(73) Assignees: MURATA MANUFACTURING CO., LTD., Nagaokakyo (JP); SHIZUKI ELECTRIC CO., INC., Nishinomiya (JP)

( * ) Notice: Subject to any disclaimer, the term of this patent is extended or adjusted under 35 U.S.C. 154(b) by 187 days.

(21) Appl. No.: 17/554,541

(22) Filed: Dec. 17, 2021

(65) Prior Publication Data

US 2022/0108837 A1    Apr. 7, 2022

Related U.S. Application Data (63) Continuation of application No. PCT/JP2020/017752, filed on Apr. 24, 2020.

(30) Foreign Application Priority Data

Aug. 8, 2019  (JP) ................... 2019-146346

(51) Int. Cl.
*H01G 4/224* (2006.01)
*C08K 7/04* (2006.01)
(Continued)

(52) U.S. Cl.
CPC ............. *H01G 4/224* (2013.01); *C08K 7/04* (2013.01); *C08K 13/04* (2013.01); *C08L 63/00* (2013.01);
(Continued)

(58) Field of Classification Search
CPC .......... H01G 4/224; H01G 4/236; H01G 4/32; H01G 4/33; C08K 7/04; C08K 13/04; C08L 63/00
See application file for complete search history.

(56) References Cited

U.S. PATENT DOCUMENTS

| | | | | |
|---|---|---|---|---|
| 6,043,972 A | * | 3/2000 | Westermann | H01G 2/065 |
| | | | | 361/308.1 |
| 8,837,115 B2 | * | 9/2014 | Ishida | H01G 9/012 |
| | | | | 361/520 |

(Continued)

FOREIGN PATENT DOCUMENTS

| | | |
|---|---|---|
| JP | S58173226 U | 11/1983 |
| JP | H11307387 A | 11/1999 |

(Continued)

OTHER PUBLICATIONS

Written Opinion of the International Searching Authority issued for PCT/JP2020/017752, dated Jul. 21, 2020.

(Continued)

*Primary Examiner* — Michael P McFadden
(74) *Attorney, Agent, or Firm* — Arentfox Shiff LLP (57) ABSTRACT

A film capacitor 1 that includes: a capacitor element including a metallized film with a resin film and a metal layer on a surface of the resin film; an outer case that houses the capacitor element; and a filling resin that fills a space between the capacitor element and the outer case, wherein the outer case includes a resin composition that contains a liquid crystal polymer and an inorganic filler, and an amount of exposure of the inorganic filler from an outer surface of the outer case is 5% to 90%.

18 Claims, 4 Drawing Sheets

(51) Int. Cl.
*C08K 13/04* (2006.01)
*C08L 63/00* (2006.01)
*H01G 4/236* (2006.01)
*H01G 4/32* (2006.01)
*H01G 4/33* (2006.01)

(52) U.S. Cl.
CPC ............... *H01G 4/236* (2013.01); *H01G 4/32* (2013.01); *H01G 4/33* (2013.01)

(56) References Cited

U.S. PATENT DOCUMENTS

| | | | | |
|---|---|---|---|---|
| 2006/0228623 | A1* | 10/2006 | Ebi | H01M 50/169 429/185 |
| 2008/0068775 | A1* | 3/2008 | Imamura | H01G 4/224 361/301.1 |
| 2010/0039748 | A1* | 2/2010 | Fujii | H01G 4/224 361/274.1 |
| 2011/0102966 | A1* | 5/2011 | Takeoka | H01G 2/08 361/301.3 |
| 2012/0225339 | A1* | 9/2012 | Nakaguchi | H01M 50/213 429/96 |
| 2020/0294717 | A1 | 9/2020 | Jogan et al. | |
| 2020/0294718 | A1 | 9/2020 | Majima et al. | |

FOREIGN PATENT DOCUMENTS

| | | | |
|---|---|---|---|
| JP | 2005222910 | A | 8/2005 |
| JP | 2006108228 | A | 4/2006 |
| JP | 2007173351 | A | 7/2007 |
| JP | 2007311625 | A | 11/2007 |
| KR | 20160140258 | A * | 12/2016 |
| WO | 2019146751 | A1 | 8/2019 |

OTHER PUBLICATIONS

International Search Report issued for PCT/JP2020/017752, dated Jul. 21, 2020.

* cited by examiner

FILM CAPACITOR AND EXTERIOR CASE FOR FILM CAPACITOR

CROSS REFERENCE TO RELATED APPLICATIONS

The present application is a continuation of International application No. PCT/JP2020/017752, filed Apr. 24, 2020, which claims priority to Japanese Patent Application No. 2019-146346, filed Aug. 8, 2019, the entire contents of each of which are incorporated herein by reference.

FIELD OF THE INVENTION

The present invention relates to a film capacitor and an outer case of the film capacitor.

BACKGROUND OF THE INVENTION

Metallized film capacitors include a capacitor element including wound or laminated metallized films, each metallized film including a deposited metal film on a surface of a resin film. In use of such a metallized film capacitor in a high temperature, high humidity environment, water enters the capacitor to cause hydroxylation of the deposited metal film, leading to loss of conductivity of the deposited metal film. This reduces the capacitance of the capacitor.

One known method to protect a capacitor is to house a capacitor element in a metal case excellent in a water vapor barrier property. Here, lead terminals connected to the capacitor element and the metal case are electrically insulated from each other because the metal case is highly electrically conductive.

A resin case made of polybutylene terephthalate (PBT), polyphenylene sulfide (PPS), or a like resin, which have a high insulation property, can also be used instead of the metal case. Use of such a resin case allows elimination of the insulation provision, but significantly reduces the water vapor barrier property as compared to metal cases. A thick resin case is used in order to achieve the moisture resistance reliability under 85° C./85% RH conditions having been demanded in the high reliability markets including the automobile market. However, such a thick resin case does not allow for the miniaturization of components.

Patent Literature 1, in response to the issue above, discloses a metallized film capacitor including a capacitor element, a resin case that houses the capacitor element, and a filling resin filling the space between the capacitor element and the resin case, wherein a gas barrier plastic film is disposed in the vicinity of the inner wall of the resin case between the capacitor element and the resin case. Patent Literature 2 discloses a metallized film capacitor including a case, a capacitor element housed in the case, and a resin filling the case and embedding the capacitor element, wherein a metal foil laminate sheet is disposed between the capacitor element and the top surface of the resin.

Patent Literature 3 discloses that a case for housing a capacitor element may be made of a liquid crystalline polymer (LCP) instead of PBT or PPS.

Patent Literature 1: JP 2007-173351 A
Patent Literature 2: JP 2007-311625 A
Patent Literature 3: JP 2005-222910 A

SUMMARY OF THE INVENTION

Protection of a capacitor element using a plastic film or a metal foil laminate sheet as in Patent Literature 1 or Patent Literature 2 may raise issues including a decrease in the workability in filling a case with a resin and an increase in the cost.

In contrast, an outer case that is for housing a capacitor element and made of an LCP material as in Patent Literature 3 has a better gas barrier property than a resin case made of PBT or PPS and requires no insulation provision unlike a metal case.

An outer case made of an LCP material is producible by injection molding. Typically, a molded article of an LCP material is known to include a core layer of a fibrous resin whose fibers having a low degree of orientation are randomly oriented; skin layers of a resin having a high degree of orientation and sandwiching the core layer; and surface skin layers of a resin having an even higher degree of orientation on the surfaces of the respective skin layers.

Surface skin layers easily separate from the skin layers due to external shock or abrasion. An outer case made of an LCP material may therefore cause separation of a resin from the outer surface, making the appearance of the film capacitor poor. In particular, the outer surface of an outer case with a mark such as a laser mark or an ink mark, for example, may cause separation of a resin from the outer surface, decreasing the visibility of the mark.

The present invention was made to solve the above problem, and aims to provide a film capacitor capable of reducing or preventing separation of a resin from the outer surface of its outer case that has excellent appearance. The present invention also aims to provide an outer case of the film capacitor.

The film capacitor of the present invention includes a capacitor element including a metallized film with a resin film and a metal layer on a surface of the resin film; an outer case that houses the capacitor element; and a filling resin that fills a space between the capacitor element and the outer case, wherein the outer case comprises a resin composition that contains a liquid crystal polymer and an inorganic filler, and an amount of exposure of the inorganic filler from an outer surface of the outer case is 5% to 90%.

An outer case of a film capacitor of the present invention comprises a resin composition that contains a liquid crystal polymer and an inorganic filler, and an amount of exposure of the inorganic filler from an outer surface of the outer case is 5% to 90%.

The present invention can provide a film capacitor capable of reducing or preventing separation of a resin from the outer surface of its outer case that has excellent appearance.

DETAILED DESCRIPTION OF THE PREFERRED EMBODIMENTS

The film capacitor of the present invention is described below.

The present invention is not limited to the following preferred embodiments, and may be suitably modified without departing from the gist of the present invention.

Combinations of two or more preferred features described in the following preferred features are also within the scope of the present invention.

An outer case of a film capacitor described below is also encompassed by the present invention.

The film capacitor of the present invention includes a capacitor element including a metallized film with a resin film and a metal layer on a surface of the resin film, an outer case that houses the capacitor element, and a filling resin that fills a space between the capacitor element and the outer case.

In the film capacitor of the present invention, the outer case comprises a resin composition that contains a liquid crystal polymer and an inorganic filler, and an amount of exposure of the inorganic filler from the outer surface of the outer case is 5% to 90%.

When the amount of exposure of the inorganic filler from the outer surface of the outer case falls within the range above, separation of the resin from the outer surface of the outer case can be reduced or prevented. This is presumably because the presence of the inorganic filler in the outer surface of the outer case decreases the degree of orientation of the surface skin layers, inhibiting the formation of an interface between the skin layers and the respective surface skin layers. In contrast, when the amount of exposure of the inorganic filler from the outer surface of the outer case is excessively large, the outer surface of the outer case is rough and thus appears poor. In consideration of these conditions, the amount of exposure of the inorganic filler from the outer surface of the outer case is set to 5% to 90%.

Preferably, for reduction or prevention of separation of the resin from the outer surface of the outer case, the amount of exposure of the inorganic filler from the outer surface of the outer case is 50% or more.

Herein, the amount of exposure of the inorganic filler from the outer surface of the outer case is measurable by the following method using a field emission scanning electron microscope (available from JEOL Ltd., JSM-300LV) and an energy dispersive X-Ray spectrometer (available from Oxford Instruments, AZtec Advance X-MAX20×2).

Element mapping is performed in a ×50 observation field of view using the low vacuum function at an accelerating voltage of 15 kV. The analysis time per pixel is 100 µs. From the resulting mapping data, the ratio of the number of pixels in which an inorganic element, such as Si, Ca, or Mg, in the inorganic filler was detected to the total number of pixels is calculated. Thus, the amount of exposure of the inorganic filler is determined. An element is considered to be detected when the characteristic X ray counts per second (cps) is one or more. In the present evaluation, the detection is performed on the flat portion of the outer surface of the outer case, excluding the rounded R portions, the portions corresponding to the gates in injection molding, and the openings.

As described above, the "outer surface of the outer case" in determination of the amount of exposure of the inorganic filler means the region on which measurement can be performed by the method above. In other words, the phrase means a three-dimensional region with a certain depth, not a two-dimensional surface. Also, any inorganic element detected by the method above even though the inorganic filler including the inorganic element is not actually exposed from the outer surface of the outer case is taken into account in determining the amount of exposure of the inorganic filler from the outer surface of the outer case.

Figure 1:
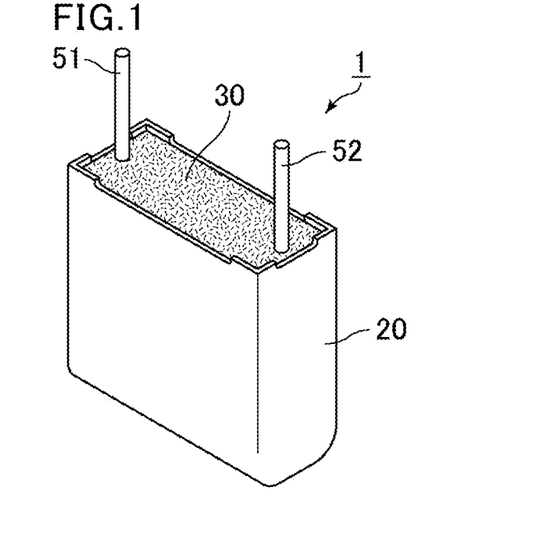
FIG. 1 is a schematic perspective view of a film capacitor according to one embodiment of the present invention.
Figure 2:
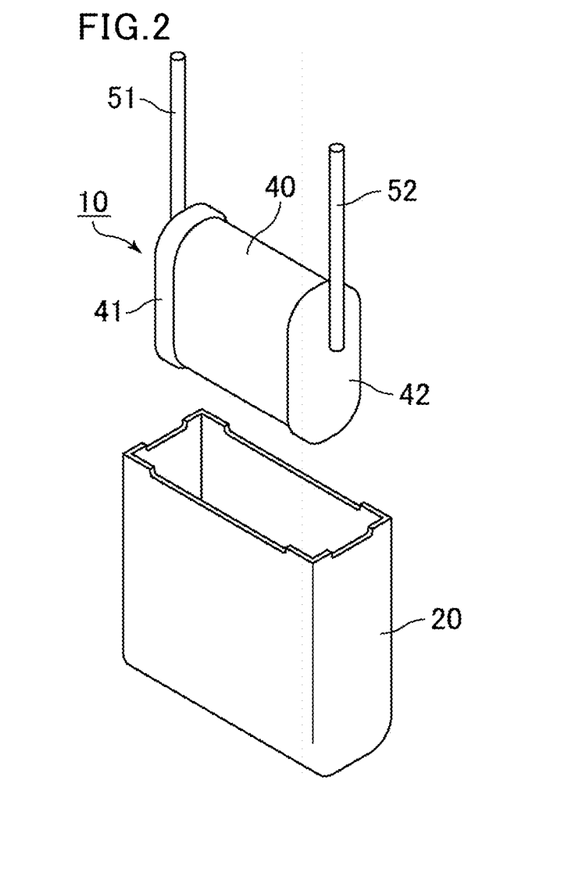
FIG. 2 is an exploded perspective view of the film capacitor shown in FIG. 1.
Figure 3A:
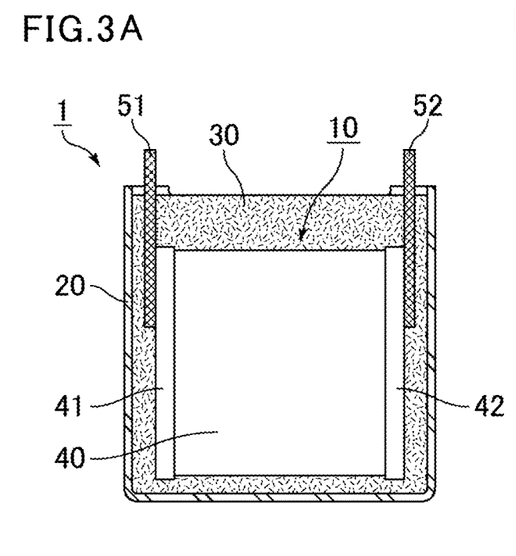
FIG. 3A and FIG. 3B are each a schematic cross-sectional view of the film capacitor shown in FIG. 1.
Figure 3B:
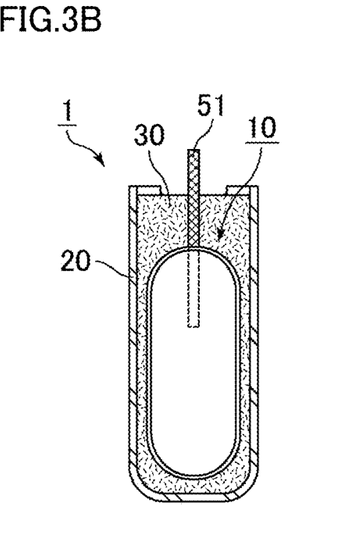

FIG. 1 is a schematic perspective view of a film capacitor according to one embodiment of the present invention. FIG. 2 is an exploded perspective view of the film capacitor shown in FIG. 1. FIG. 2 shows a state of the capacitor element before the capacitor element is housed in an outer case. FIG. 3A and FIG. 3B are each a schematic cross-sectional view of the film capacitor shown in FIG. 1.

A film capacitor 1 shown in FIG. 1 includes a capacitor element 10 (see FIG. 2, FIG. 3A, and FIG. 3B), an outer case 20 that houses the capacitor element 10, and a filling resin 30 that fills a space between the capacitor element 10 and the outer case 20.

As shown in FIG. 2, a rectangular parallelepiped space is formed in the outer case 20. Preferably, the capacitor element 10 is disposed apart from the inner faces of the outer case 20 and at a center in the outer case 20. In order to hold the capacitor element 10, the space between the outer faces of the capacitor element 10 and the inner faces of the outer case 20 is filled with the filling resin 30 (see FIG. 1, FIG. 3A, and FIG. 3B) such as an epoxy resin. The outer case 20 has a bottomed tubular shape having an opening at one end. The filling resin 30 fills the inside of the outer case 20, from the opening of the outer case 20 to surround the capacitor element 10. The outer case 20 and the capacitor element 10 can be bonded and fixed together as the epoxy resin is thermally cured.

In FIG. 2 and FIG. 3A, the capacitor element 10 includes a wound body 40 of metallized films, and a first external electrode 41 and a second external electrode 42 on both sides of the wound body 40. A first lead terminal 51 is electrically connected to the first external electrode 41, and a second lead terminal 52 is electrically connected to the second external electrode 42. As shown in FIG. 1 and FIG. 3A, the first lead terminal 51 and the second lead terminal 52 protrude from the inside to the outside of the outer case 20.

Outer Case

The outer case defining the film capacitor of the present invention has, for example, a bottomed tubular shape including an opening at an end.

Figure 4A:
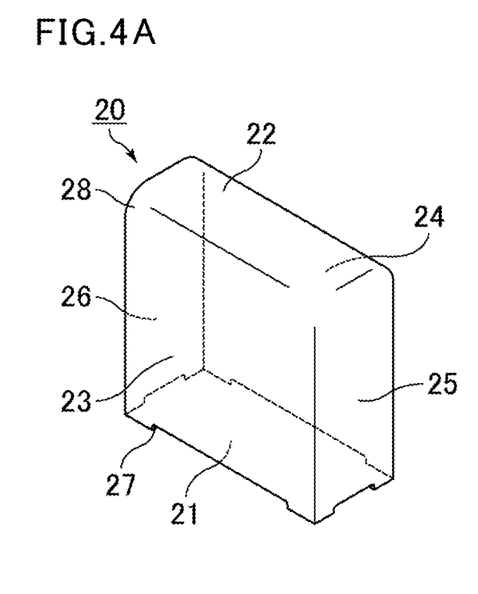
FIG. 4A and FIG. 4B are each a schematic perspective view of an example of an outer case defining the film capacitor shown in FIG. 1.
Figure 4B:
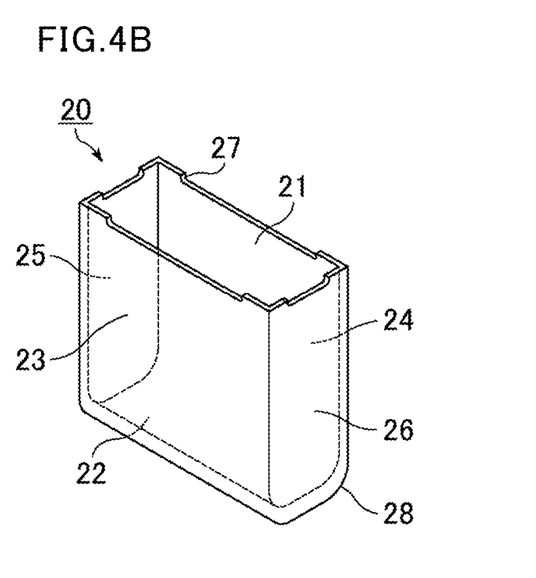

FIG. 4A and FIG. 4B are each a schematic perspective view of an example of an outer case defining the film capacitor shown in FIG. 1.

The outer case 20 shown in FIG. 4A and FIG. 4B has a bottomed quadrangular tubular shape. The bottomed quadrangular tubular shape includes a substantially rectangular opening 21 at one end, a bottom 22 opposing the opening 21 and sealing the other end, and a quadrangular tubular lateral portion with four lateral walls 23, 24, 25, and 26 extending from the bottom 22 toward the opening 21. The outer case 20 may have a shape such as a bottomed cylindrical shape including a cylindrical lateral portion instead of the quadrangular tubular lateral portion.

In FIG. 4A and FIG. 4B, the lateral portion of the outer case 20 includes the first lateral wall 23, the second lateral wall 24 having substantially the same area as the first lateral wall 23 and spaced apart from and opposite to the inner face of the first lateral wall 23, the third lateral wall 25 connecting between one side of the first lateral wall 23 and one side of the second lateral wall 24 and having a smaller area than the first lateral wall 23, and the fourth lateral wall 26 connecting between the other side of the first lateral wall 23 and the other side of the second lateral wall 24, having substantially the same area as the third lateral wall 25, and spaced apart from and opposite to the inner face of the third lateral wall 25.

As shown in FIG. 4A and FIG. 4B, preferably, the lateral portion of the outer case 20 includes depressions 27 on the four sides of the opening 21. The depressions 27 are formed downward from the opening 21 toward the bottom 22, and extend along the respective four sides of the opening 21. Providing the depressions on the opening surface of the outer case prevents an increase in inner pressure due to hermetic sealing between the film capacitor and a substrate when the film capacitor is mounted on the substrate. The outer case may not include any depressions.

As shown in FIG. 4A and FIG. 4B, preferably, the lateral portion of the outer case 20 includes tapered portions 28 extending along the respective sides connecting between the lateral walls. In FIG. 4A and FIG. 4B, a tapered portion 28 is provided at the corner on the bottom 22 of each of the first lateral wall 23 and the second lateral wall 24. Also, a tapered portion is provided on the side connecting between the lower side closer to the bottom 22 of the third lateral wall 25 and the bottom 22, and a tapered portion is provided on the side connecting between the lower side closer to the bottom 22 of the fourth lateral wall 26 and the bottom 22. The lateral portion of the outer case may not include any tapered portions.

In the film capacitor of the present invention, it is preferred to reduce or prevent the temperature increase of the capacitor element inside the film capacitor due to the radiation heat from a substrate on which the film capacitor is mounted or from a bus bar terminal. Thus, preferably, the outer case is opaque (e.g., black) even when used at a high temperature of 100° C. The term "opaque" as used herein means that the outer case has a transmittance of visible light having a wavelength of 400 nm to 700 nm of 5% or less.

In the film capacitor of the present invention, the outer case comprises a resin composition containing a liquid crystal polymer (LCP) and an inorganic filler.

The LCP contained in the resin composition can be one containing p-hydroxybenzoic acid and 6-hydroxy-2-naphthoic acid group in the skeleton, for example. Other LCPs that can be used are those obtained by polycondensation of various components such as phenol, phtalic acid, and ethylene terephtalate, other than p-hydroxybenzoic acid and 6-hydroxy-2-naphthoic acid group.

LCP can be classified into type I, type II, and type III. Yet, examples of materials include those of the LCP mentioned above.

The inorganic filler contained in the resin composition may be a material having higher strength than the LCP. The inorganic filler is preferably a material having a higher melting point than the LCP, and is more preferably a material having a melting point of 680° C. or higher.

The form of the inorganic filler is not limited. Examples thereof include those having a shape with a longitudinal direction, such as fibrous inorganic fillers and plate-shaped inorganic fillers. Two or more of these inorganic fillers may be used in combination.

The resin composition in the film capacitor of the present invention contains both a fibrous inorganic material and a plate-shaped inorganic material as the inorganic filler. In this case, the amount of exposure of the inorganic filler from the outer surface of the outer case can be increased.

As used herein, the term "fibrous" refers to a shape in which the length of the filler in the longitudinal direction and the cross-sectional diameter in a cross section perpendicular to the longitudinal direction satisfy the following relationship where the length in longitudinal direction divided by the cross-sectional diameter is greater than or equal to 5 (i.e., the aspect ratio is 5:1 or greater). Here, the cross-sectional diameter is the distance between two points with the longest distance therebetween on the outer circumference of the cross section. When the cross-sectional diameter varies in the longitudinal direction, a portion with the largest cross-sectional diameter is used for the measurement.

The term "plate-shaped" refers to a shape in which the cross-sectional diameter of a surface having the largest projected area and the maximum height in a direction perpendicular to the cross section satisfy the following relationship where the cross-sectional diameter divided by the height is greater than or equal to 3.

In the film capacitor of the present invention, the resin composition may contain an inorganic filler satisfying both "fibrous" and "plate-shaped" conditions. In this case, the resin composition contains only one type of inorganic material as the inorganic filler. Still, such a resin composition is also encompassed by "the resin composition containing both a fibrous inorganic material and a plate-shaped inorganic material as the inorganic filler."

Preferably, the inorganic filler is dispersed in the outer case, and at least a portion of the filler is oriented from the bottom of the case toward the opening and at least a portion of the filler is oriented toward the adjacent lateral walls on each lateral wall of the lateral portion of the outer case.

Preferably, the inorganic filler has a diameter of at least 5 μm and a length of at least 50 μm. In particular, preferably, the inorganic filler is dispersed throughout the outer case, without forming aggregations.

Examples of the inorganic filler include materials such as fibrous glass filler, mica, talc, and various oxides and hydroxides.

For reduction in the amount of deformation of the outer case in the film capacitor of the present invention, the amount of the inorganic filler in the resin composition is preferably 5 wt % or more, more preferably 15 wt % or more. Also, for sufficient moldability of the outer case, the amount of the inorganic filler in the resin composition is preferably 60 wt % or less.

The amount of the inorganic filler in the resin composition can be determined as follows: using a 0.5-mm thick test piece (20 mm×20 mm), the weight of residual components regarded as inorganic components is measured by ash measurement or thermogravimetric analysis, and the amount of the inorganic filler is calculated from the initial weight and the weight of the residual components.

Specifically, the measurement method includes burning organic materials and heating the combustion residue at a high temperature until a constant mass is obtained, based on JIS K 7250 Method A (direct incineration method).

In the film capacitor of the present invention, the amount of LCP in the resin composition is preferably 40 wt % to 95 wt %, more preferably 40 wt % to 85 wt %.

In the film capacitor of the present invention, the outer case is producible by injection molding, for example. The outer case may therefore be an injection-molded article with a gate mark. The gate mark may be on the outer surface of the outer case or the inner surface of the outer case. One gate mark may be formed or two or more gate marks may be formed. A gate mark means a mark on a site of a molded article, the site corresponding to the position of the injection port (gate) through which the resin was injected into the cavity of a mold in injection molding of an outer case.

In the film capacitor of the present invention, the outer surface of the outer case has at least one of a laser mark or an ink mark. Since the resin is not easily separated from the outer surface of the outer case in the film capacitor of the present invention, excellent visibility of the mark is achieved.

Filling Resin

In the film capacitor of the present invention, the filling resin fills the space between the capacitor element and the outer case.

The filling resin can be suitably selected according to a required function. The filling resin may be, for example, an epoxy resin, a silicone resin, or a urethane resin. The curing agent for an epoxy resin may be an amine curing agent or an imidazole curing agent. The filling resin may contain only resin, or may also contain a reinforcing agent in order to improve the strength. The reinforcing agent may be silica or alumina.

The capacitor element can be shielded from outside air by filling the space between the capacitor element and the outer case with the filling resin. Thus, it is preferred to suitably select a low moisture-permeable resin and increase the thickness of the resin at the opening of the outer case.

Preferably, the resin at the opening of the outer case is sufficiently thick in the acceptable range of volume (physical size) of the whole capacitor. Specifically, the thickness is preferably 2 mm or more, more preferably 4 mm or more. In particular, more preferably, the capacitor element in the outer case is arranged closer to the bottom than the opening of the outer case, so that the thickness of the resin on the opening side of the outer case is greater than the thickness of the resin on the bottom side of the outer case.

As for the relationship between the height of the filling resin and the height of the outer case, the resin may not fill the outer case up to the top, may fill the outer case up to the top, or may slightly overfill the outer case due to surface tension, while the resin at the opening of the outer case is made as thick as possible.

Capacitor Element

In the film capacitor of the present invention, for example, the capacitor element has a pillar shape having an oblong cross section, and includes external electrodes formed by, for example, metal spraying (metallikon) at both ends of the pillar shape in the central axis direction.

Figure 5A:
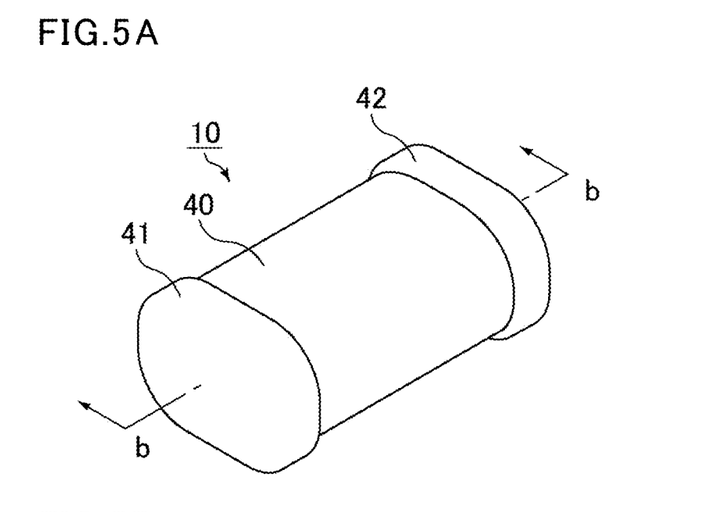
FIG. 5A is a schematic perspective view of an example of a capacitor element defining the film capacitor of the present invention.
Figure 5B:
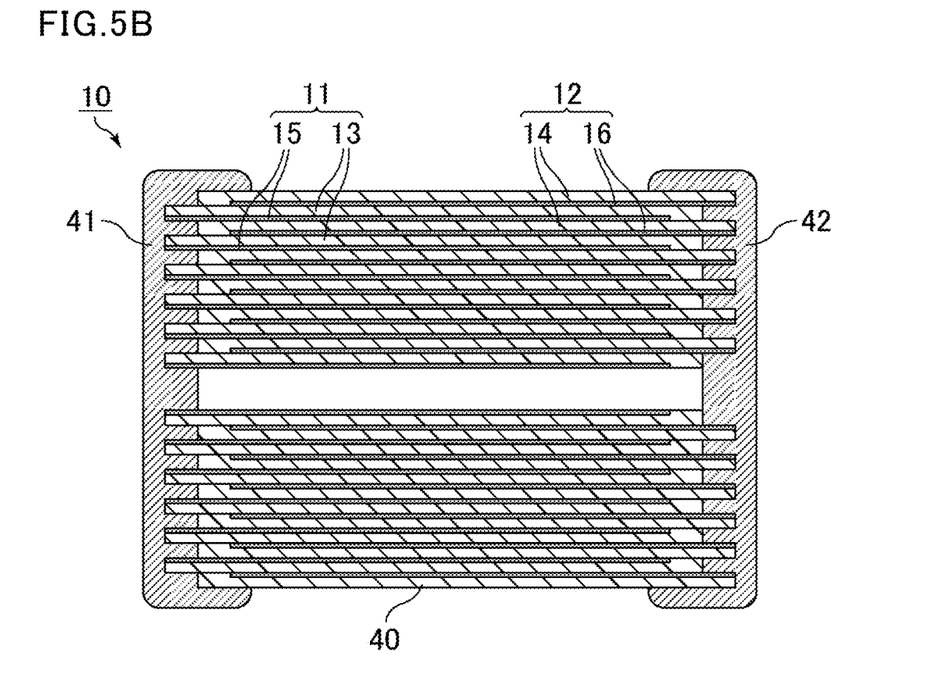
FIG. 5B is a cross-sectional view taken along line b-b of the capacitor element shown in FIG. 5A.

FIG. 5A is a schematic perspective view of an example of the capacitor element defining the film capacitor of the present invention. FIG. 5B is a cross-sectional view taken along line b-b of the capacitor element shown in FIG. 5A.

The capacitor element 10 shown in FIG. 5A and FIG. 5B includes a wound body 40 of metallized films in which first metallized films 11 and second metallized films 12 are wound in a laminated state, and the first external electrode 41 and the second external electrode 42 are connected to both ends of the wound body 40. As shown in FIG. 5B, each first metallized film 11 includes a first resin film 13 and a first metal layer (counter electrode) 15 on a surface of the first resin film 13. Each second metallized film 12 includes a second resin film 14 and a second metal layer (counter electrode) 16 on a surface of the second resin film 14.

As shown in FIG. 5B, a first metal layer 15 and a second metal layer 16 oppose each other with a first resin film 13 or a second resin film 14 therebetween. Further, the first metal layer 15 is electrically connected to the first external electrode 41, and the second metal layer 16 is electrically connected to the second external electrode 42.

The first resin film 13 and the second resin film 14 may have different configurations, but preferably have the same configuration.

The first metal layer 15 is formed on one side of the first resin film 13 such that it extends to a first end but not to a second end. The second metal layer 16 is formed on one side of the second resin film 14 such that it extends to the second end but not to the first end. The first metal layer 15 and the second metal layer 16 are aluminum layers, for example.

Figure 6:
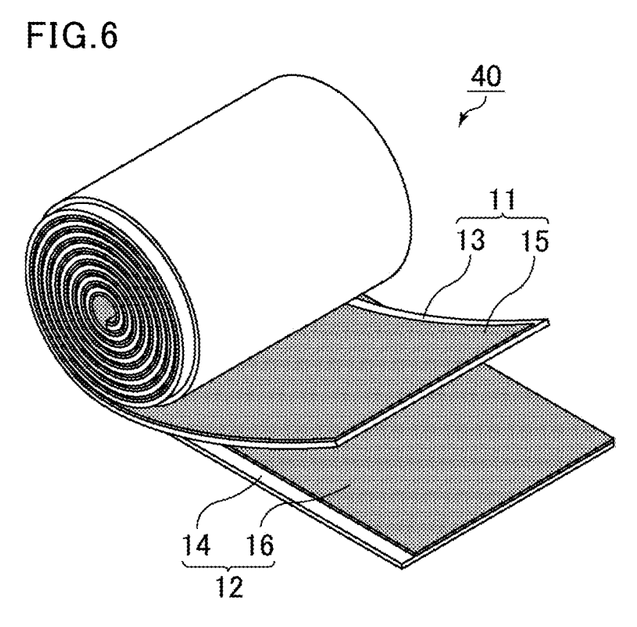
FIG. 6 is a schematic perspective view of an example of a wound body of metallized films defining the capacitor element shown in FIG. 5A and FIG. 5B.

FIG. 6 is a schematic perspective view of an example of the wound body of the metallized films defining the capacitor element shown in FIG. 5A and FIG. 5B.

As shown in FIG. 5B and FIG. 6, the first resin film 13 and the second resin film 14 are laminated in a displaced relationship from each other in a width direction (in FIG. 5B, in a left-to-right direction) such that one end of the first metal layer 15 which extends to the periphery of the first resin film 13 is exposed from the laminate of the films and that one end of the second metal layer 16 which extends to the periphery of the second resin film 14 is also exposed from the laminate of the films. As shown in FIG. 6, the first resin film 13 and the second resin film 14 are wound in a laminated state into the wound body 40. The first metal layer 15 and the second metal layer 16 are laminated while they maintain a state in which one end of the first metal layer 15 and one end of the second metal layer 16 are exposed.

In FIG. 5B and FIG. 6, the first resin film 13 and the second resin film 14 are wound such that the second resin film 14 is outside the first resin film 13 and that the first metal layer 15 and the second metal layer 16 face inside.

The first external electrode 41 and the second external electrode 42 are formed by, for example, spraying zinc or the like onto both end surfaces of the wound body 40 of the metallized films obtained as described above. The first external electrode 41 is in contact with the exposed end of the first metal layer 15, and is thus electrically connected to the first metal layer 15. The second external electrode 42 is in contact with the exposed end of the second metal layer 16, and is thus electrically connected to the second metal layer 16.

In the film capacitor of the present invention, preferably, the resin films defining the capacitor element have heat resistance of 125° C. or higher.

In this case, the film capacitor can be used in a high-temperature environment of 125° C. or higher.

In the film capacitor of the present invention, preferably, the resin films defining the capacitor element contain, as a main component, a resin containing at least one of a urethane bond or a urea bond. Examples of such a resin include a urethane resin having a urethane bond and urea resin having a urea bond. Examples may also include a resin having both a urethane bond and a urea bond. Specific examples thereof include curable resins and vapor-deposited polymer films which are described later.

The presence of a urethane bond and/or a urea bond can be confirmed using a Fourier transform infrared (FT-IR) spectrophotometer.

The term "main component" of the resin films as used herein refers to a component with the higher weight percentage, and preferably refers to a component whose weight percentage is more than 50 wt %. Thus, the resin films may contain other components in addition to the main component. Examples of the other components include additives such as silicone resin and uncured residues of starting materials such as a first organic material and a second organic material which are described later.

In the film capacitor of the present invention, the resin films defining the capacitor element may contain a curable resin as a main component. The curable resin may be a thermosetting resin or a photocurable resin. The curable resin may or may not contain at least one of a urethane bond or a urea bond.

The term "thermosetting resin" as used herein refers to a heat-curable resin, and the curing method is not limited. Thus, the thermosetting resin encompasses a resin cured by a method other than heat (such as light or electron beam) as long as the resin is heat curable. Some materials may start a reaction due to their own reactivity. The thermosetting resin also includes such materials that do not necessarily require external heat, light, or the like to start curing. The same applies to the photocurable resins, and the curing method is not limited.

In the film capacitor of the present invention, the resin films defining the capacitor element may each include a vapor-deposited polymer film as a main component. The vapor-deposited polymer film may or may not contain at least one of a urethane bond or a urea bond.

The term "vapor-deposited polymer film" refers to a film formed by vapor deposition polymerization. In principle, the curable resin includes such a film.

In the film capacitor of the present invention, preferably, the resin films defining the capacitor element are made of a cured product of the first organic material and the second organic material. Examples thereof include a cured product obtained by a reaction between a hydroxyl group (OH group) of the first organic material and an isocyanate group (NCO group) of the second organic material.

When a cured product is obtained by the above reaction, the resulting films may contain uncured residues of the starting materials. For example, the resin films may contain at least one of an isocyanate group or a hydroxyl group. In this case, the resin films may contain either one or both of an isocyanate group and a hydroxyl group.

The presence of an isocyanate group and/or a hydroxyl group can be confirmed using a Fourier transform infrared (FT-IR) spectrophotometer.

Preferably, the first organic material is a polyol having two or more hydroxyl groups in the molecule. Examples of the polyol include polyether polyols, polyester polyols, and polyvinyl acetoacetal. The first organic material may be any combination of two or more organic materials. The first organic material is preferably a phenoxy resin belonging to polyether polyols.

The second organic material is preferably an isocyanate compound, an epoxy resin, or a melamine resin having two or more functional groups in the molecule. The second organic material may be any combination of two or more organic materials.

Examples of the isocyanate compound include aromatic polyisocyanates such as diphenylmethane diisocyanate (MDI) and tolylene diisocyanate (TDI); and aliphatic polyisocyanates such as hexamethylene diisocyanate (HDI). Examples may also include modified products of these polyisocyanates, such as a modified product containing carbodiimide or urethane, for example. Of these, aromatic polyisocyanates are preferred, and MDI is more preferred.

Any epoxy resin may be used as long as it is a resin having an epoxy ring. Examples thereof include bisphenol A epoxy resins, epoxy resins having a biphenyl skeleton, epoxy resins having a cyclopentadiene skeleton, and epoxy resins having a naphthalene skeleton.

Any melamine resin may be used as long as it is an organic nitrogen compound having a triazine ring at the center of the structure and three amino groups around the triazine ring. Examples thereof include alkylated melamine resin. Examples may also include modified products of melamine.

In the film capacitor of the present invention, preferably, the resin films defining the capacitor element are obtained by molding a resin solution containing the first organic material and the second organic material into films and curing the films by heat treatment.

In the film capacitor of the present invention, the resin films defining the capacitor element may contain a thermoplastic resin as a main component. Examples of the thermoplastic resin include highly crystalline polypropylene, polyethersulfone, polyetherimide, and polyarylate.

In the film capacitor of the present invention, the resin films defining the capacitor element may contain additives that provide other functions. For example, addition of a leveling agent can provide smoothness. A more preferred additive is a material having a functional group that reacts with a hydroxyl group and/or an isocyanate group, which forms part of the crosslinked structure of the cured product. Examples of such a material include a resin having at least one functional group selected from the group consisting of epoxy groups, silanol groups, and carboxyl groups.

In the film capacitor of the present invention, the resin films defining the capacitor element may have any thickness. Yet, the thickness of each resin film is preferably 5 μm or less, more preferably less than 3.5 μm. At the same time, the thickness of the resin film is preferably 0.5 μm or more.

The thickness of the resin film can be measured by an optical film thickness gauge.

In the film capacitor of the present invention, the metal layers defining the capacitor element may contain any metal, but the metal layer preferably contains at least one selected from the group consisting of aluminum (Al), titanium (Ti), zinc (Zn), magnesium (Mg), tin (Sn), and nickel (Ni).

In the film capacitor of the present invention, the metal layers defining the capacitor element may have any thickness. Yet, in view of reducing or preventing damage to the metal layers, the thickness of each metal layer is preferably 5 nm to 40 nm.

The thickness of the metal layer can be determined by observation of a cross section obtained by cutting the metallized film in a thickness direction, using an electronic microscope such as a field emission scanning electron microscope (FE-SEM).

Figure 7:
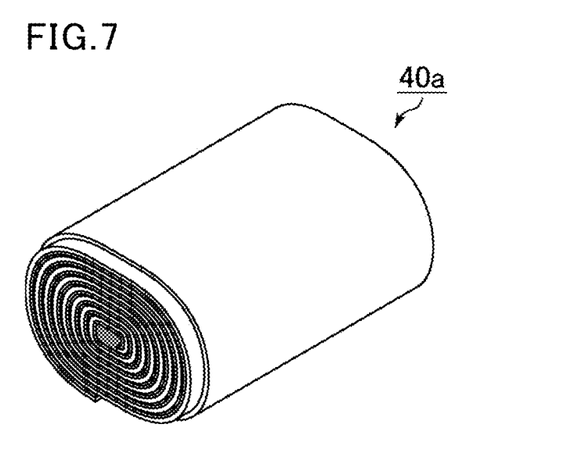
FIG. 7 is a schematic perspective view of another example of the wound body of the metallized films defining the capacitor element shown in FIG. 5A and FIG. 5B.

FIG. 7 is a schematic perspective view of another example of the wound body of the metallized films defining the capacitor element shown in FIG. 5A and FIG. 5B.

In the film capacitor of the present invention, when the capacitor element includes a wound body of metallized films, preferably, the wound body is pressed into a flat shape having an oval or oblong cross section as in a wound body 40a of the metallized films shown in FIG. 7, so that the wound body has a more compact shape than a wound body having a perfectly circular cross section.

In this case, the outer case can be made smaller by reducing the dead space inside the outer case, so that the film capacitor can be made smaller as a whole.

In the film capacitor of the present invention, when the capacitor element includes a wound body of metallized films, the capacitor element may include a cylindrical winding shaft. The winding shaft is arranged on the central axis of the metallized films being wound, and serves as a spool for winding the metallized films.

Lead Terminal

In the film capacitor of the present invention, lead terminals protrude from the filling resin filling the outer case to the outside of the outer case.

Portions of the lead terminals which are electrically connected to the respective external electrodes of the capacitor element are provided in small regions of the external electrodes. Thus, when a load is applied to the lead terminals, the lead terminals may be separated from the external electrodes. Thus, in the outer case, the filling resin is located around the external electrodes of the capacitor element and the lead terminals so as to tightly fix the external electrodes and the lead terminals. As a result, even when a load is applied to the protruding portions of the lead terminals, the connection between the lead terminals and the external electrodes is reinforced by the filling resin, preventing or reducing separation therebetween.

The lead terminals may be connected to the external electrodes in the middle of the external electrodes or at ends of the electrodes near the opening as shown in FIG. 1 of JP 4733566 B.

Other Embodiments

FIG. 1 shows an example where a single capacitor element is housed in a single outer case. Yet, for example, as shown in JP 2012-69840 A, multiple capacitor elements may be housed in a single outer case.

In addition, the above has described the case where the film capacitor is a wound film capacitor in which the first metallized film and the second metallized film are wound in a laminated state. Yet, the film capacitor may be a multilayer film capacitor in which the first metallized film and the second metallized film are laminated. Film capacitors such as a multilayer film capacitor can also achieve the above-described effects of the present invention.

Examples

Examples that more specifically disclose the film capacitor of the present invention are described below. The present invention is not limited to these examples.

Production of Outer Case

Outer cases of a film capacitor were produced by injection molding using the LCP materials A, B, C, and D each containing an inorganic filler as shown in Table 1. The mold temperature during molding was set to the upper limit temperature, the middle temperature, or the lower limit temperature of the mold temperature recommended by the manufacturer of the LCP material used.

Glass fibers each having a diameter of 10 μm and a length of 300 μm were used as the fibrous inorganic filler shown in Table 1. Talc having a cross-sectional diameter of 15 μm and a height of 1 μm was used as the plate-shaped inorganic filler shown in Table 1.

Evaluation of Outer Case

Amount of Exposure of Inorganic Filler

The samples Nos. 1 to 12 were measured for the amount of exposure of the inorganic filler from the outer surface of the outer case by the method above. The amount of exposure was measured at three sites on each sample.

Separation Resistance of Case Surface

Acrylic adhesive tape (adhesive power: 5.5 N/19 mm) was attached to the outer surface of each outer case. Whether or not removal of the tape causes separation of any fibrous resin from the outer surface of the outer case was determined. A sample which caused separation of the resin was evaluated as unacceptable, and a sample which did not cause separation of the resin was evaluated as acceptable. In addition, thermosetting polyester adhesive tape (adhesive power: 12 N/19 mm) was attached to the outer surface. A sample which did not cause separation of the resin upon removal of the tape was evaluated as excellent.

Appearance of Case

A laser mark was created on the outer surface of each outer case. A sample was evaluated as acceptable when the laser mark was clearly observable, and evaluated as unacceptable when the mark was not clearly observable.

TABLE 1

| | LCP material | A | | | | B | | |
|---|---|---|---|---|---|---|---|---|
| Inorganic filler | Form | Fibrous | | | | Fibrous | | |
| | Amount (wt %) | 30 | | | | 15 | | |
| | Sample No. | 1 | 2 | 3 | 4 | 5 | 6 |
| | Mold temperature duing case molding | Lower limit | Middle | Upper limit | Lower limit | Middle | Upper limit |
| | Amount of exposure of inorganic filler (%) | 5 | 2 | 2 | 0 | 0 | 0 |
| | Separation resistance of case surface | Acceptable | Unacceptable | Unacceptable | Unacceptable | Unacceptable | Unacceptable |
| | Appearance of case | Acceptable | Acceptable | Acceptable | Acceptable | Acceptable | Acceptable |

| | LCP material | C | | | | D | | |
|---|---|---|---|---|---|---|---|---|
| Inorganic filler | Form | Fibrous + plate-shaped | | | | Fibrous + plate-shaped | | |
| | Amount (wt %) | 40 | | | | 50 | | |
| | Sample No. | 7 | 8 | 9 | 10 | 11 | 12 |
| | Mold temperature duing case molding | Lower limit | Middle | Upper limit | Lower limit | Middle | Upper limit |
| | Amount of exposure of inorganic filler (%) | 70 | 67 | 66 | 96 | 90 | 86 |
| | Separation resistance of case surface | Excellent | Excellent | Excellent | Excellent | Excellent | Excellent |
| | Appearance of case | Acceptable | Acceptable | Acceptable | Unacceptable | Acceptable | Acceptable |

In Table 1, no inorganic element was detected on the samples with an amount of exposure of the inorganic filler of 0%.

As shown in Table 1, the samples containing a fibrous inorganic filler caused no separation of the resin from the outer surface of the outer case and thus had excellent appearance when the amount of exposure of the inorganic filler from the outer surface of the outer case was 5% to 90%.

In particular, when the inorganic filler contained both a fibrous inorganic filler and a plate-shaped inorganic filler, a better effect of reducing or preventing separation of the resin from the outer surface of the outer case was achieved.

Also, even when the same LCP material was used, the amount of exposure of the inorganic filler varied depending on the mold temperature during molding. Specifically, a low mold temperature tended to increase the amount of exposure of the inorganic filler. Thus, the mold temperature during molding may also be used to control the amount of exposure of the inorganic filler.

REFERENCE SIGNS LIST 1 film capacitor
10 capacitor element
11 first metallized film
12 second metallized film
13 first resin film
14 second resin film
15 first metal layer
16 second metal layer
20 outer case
21 opening
22 bottom
23 first lateral wall
24 second lateral wall
25 third lateral wall
26 fourth lateral wall
27 depression
28 tapered portion
30 filling resin
40, 40a wound body of metallized films
41 first external electrode
42 second external electrode
51 first lead terminal
52 second lead terminal

The invention claimed is:

1. A film capacitor comprising:
a capacitor element including a metallized film with a resin film and a metal layer on a surface of the resin film;
an outer case that houses the capacitor element; and
a filling resin that fills a space between the capacitor element and the outer case,
wherein the outer case comprises a resin composition that contains a liquid crystal polymer and an inorganic filler, and
an amount of exposure of the inorganic filler from an outer surface of the outer case is 5% to 90%.

2. The film capacitor according to claim 1, wherein the inorganic filler is a material having higher strength than the liquid crystal polymer.

3. The film capacitor according to claim 1, wherein the inorganic filler is a material having a higher melting point than the liquid crystal polymer.

4. The film capacitor according to claim 3, wherein the material of the inorganic filler has a melting point of 680° C. or higher.

5. The film capacitor according to claim 1, wherein the inorganic filler includes both a fibrous inorganic material and a plate-shaped inorganic material.

6. The film capacitor according to claim 1, wherein an amount of the inorganic filler in the resin composition is 5 wt % to 60 wt %.

7. The film capacitor according to claim 6, wherein an amount of the liquid crystal polymer in the resin composition is 40 wt % to 95 wt %.

8. The film capacitor according to claim 1, wherein the outer surface of the outer case has at least one of a laser mark or an ink mark.

9. The film capacitor according to claim 1, wherein the outer case is an injection-molded article having a gate mark.

10. An outer case of a film capacitor, the outer case comprising:
a resin composition that contains a liquid crystal polymer and an inorganic filler, and
an amount of exposure of the inorganic filler from an outer surface of the outer case is 5% to 90%.

11. The outer case according to claim 10, wherein the inorganic filler is a material having higher strength than the liquid crystal polymer.

12. The outer case according to claim 10, wherein the inorganic filler is a material having a higher melting point than the liquid crystal polymer.

13. The outer case according to claim 12, wherein the material of the inorganic filler has a melting point of 680° C. or higher.

14. The outer case according to claim 10, wherein the inorganic filler includes both a fibrous inorganic material and a plate-shaped inorganic material.

15. The outer case according to claim 10, wherein an amount of the inorganic filler in the resin composition is 5 wt % to 60 wt %.

16. The outer case according to claim 15, wherein an amount of the liquid crystal polymer in the resin composition is 40 wt % to 95 wt %.

17. The outer case according to claim 10, wherein the outer surface of the outer case has at least one of a laser mark or an ink mark.

18. The outer case according to claim 10, wherein the outer case is an injection-molded article having a gate mark.

* * * * *